US008890901B2

(12) United States Patent
Lee et al.

(10) Patent No.: US 8,890,901 B2
(45) Date of Patent: Nov. 18, 2014

(54) COLOR MANAGEMENT CIRCUIT AND RELATED METHOD

(75) Inventors: Yu-Chung Lee, Taoyuan County (TW); Pei-Chen Huang, Tainan County (TW)

(73) Assignee: Realtek Semiconductor Corp., Hsinchu (TW)

( * ) Notice: Subject to any disclaimer, the term of this patent is extended or adjusted under 35 U.S.C. 154(b) by 800 days.

(21) Appl. No.: 12/875,147

(22) Filed: Sep. 3, 2010

(65) Prior Publication Data

US 2011/0057963 A1 Mar. 10, 2011

(30) Foreign Application Priority Data

Sep. 9, 2009 (TW) ................................ 98130335 A

(51) Int. Cl.

| | |
|---|---|
| ***G09G 5/10*** | (2006.01) |
| *G09G 3/36* | (2006.01) |
| *G09G 5/02* | (2006.01) |
| *H04N 5/202* | (2006.01) |
| *G09G 5/06* | (2006.01) |

(52) U.S. Cl.
CPC .. *G09G 5/02* (2013.01); *G09G 5/06* (2013.01); *G09G 2320/0693* (2013.01); *G09G 2320/0666* (2013.01)
USPC ............. 345/690; 345/89; 345/600; 345/601; 348/254; 348/674

(58) Field of Classification Search
USPC .................................. 345/690; 348/254, 674
See application file for complete search history.

(56) References Cited

U.S. PATENT DOCUMENTS

| | | | | |
|---|---|---|---|---|
| 5,781,315 | A * | 7/1998 | Yamaguchi | 358/520 |
| 7,181,088 | B2 | 2/2007 | Lin | |
| 7,382,382 | B2 | 6/2008 | Furukawa et al. | |
| 2001/0004406 | A1 * | 6/2001 | Enomoto | 382/282 |
| 2003/0117414 | A1 * | 6/2003 | Sasaki | 345/589 |

FOREIGN PATENT DOCUMENTS

| | | | |
|---|---|---|---|
| CN | 1938752 | A | 3/2007 |
| TW | 564645 | B | 12/2003 |
| TW | I251197 | B | 3/2006 |
| TW | 200809716 | | 2/2008 |
| TW | I294616 | | 3/2008 |
| WO | 2005104083 | A2 | 11/2005 |

OTHER PUBLICATIONS

Jonathan Sachs: "Color Management"; Copyright 1999-2008 Digital Light & Color; pp. 1-40.
TW Office Action dated Apr. 19, 2013.

* cited by examiner

*Primary Examiner* — Kent Chang
*Assistant Examiner* — Chayce Bibbee
(74) *Attorney, Agent, or Firm* — McClure, Qualey & Rodack, LLP

(57) ABSTRACT

A color management circuit and a related color management method are provided. The color management circuit is disposed in a display device which has a panel provided with a panel conversion characteristic. The color management circuit includes: a first nonlinear conversion circuit, a color matrix conversion circuit and a second nonlinear conversion circuit. The first nonlinear conversion circuit is utilized for performing a first nonlinear conversion upon a color data to generate a first conversion data. The color matrix conversion circuit is utilized for performing a liner matrix calculation upon the first conversion data to generate a matrix calculation data. The second nonlinear conversion circuit is utilized for performing a second nonlinear conversion upon the matrix calculation data to generate a second conversion data to the panel, wherein a combined conversion characteristic of the second conversion characteristic with the panel conversion characteristic is substantially linear.

20 Claims, 5 Drawing Sheets

COLOR MANAGEMENT CIRCUIT AND RELATED METHOD

BACKGROUND OF THE INVENTION

1. Field of the Invention

The present invention relates to color management, and more particularly, to a color management circuit and a related color management method. The color calibration method and system provided by the embodiments of the present invention enable a color management circuit to be accurately configured, thereby significantly improving the matching between a display device and a color space.

2. Description of the Prior Art

In order to have a consistent displaying effect when displaying same colors on different display devices, there are several industrial color space standards for image storing and display devices, including well-known standards RGB (sRGB) and Adobe RGB.

sRGB color space is usually used in monitors, printers, and the Internet. When colors in an image data are defined in sRGB color space, the image can be perfectly displayed on a display device that is fully matched with sRGB color space. However, a color gamut of a general display device is usually not fully matched with the color gamut defined in sRGB space. Please refer to FIG. 1 which exhibits relationships between the color gamut of the sRGB color space and color gamuts of different display devices on a CIE1931 xy chromaticity diagram. As shown in FIG. 1, colors regarding the area inside the triangle K represent the color gamut defined in sRGB color space while colors regarding the areas inside the triangle L and M respectively represent the color gamuts supported by different display devices. In general, when the color gamut of the display device is not fully matched with the color gamut defined in sRGB color space, a color management circuit or software is required to make the display device able to display colors that are not originally supported by the display device, in order to approach the corresponding colors as defined in sRGB color space.

It is necessary to calibrate the display device according to different color spaces. With the help of the color management circuit, the display device is able to accurately display colors defined in different color spaces (e.g. sRGB or Adobe RGB). In a conventional color calibration process, the colors of white, red, green, blue, cyan, magenta, and yellow having the maximum luminance that can be displayed by the display device are utilized as a reference to adjust the proportion of RGB components of the display device in order to make these seven colors approach the corresponding colors having the maximum luminance as defined in the color space.

For sRGB color space, however, the conventional color calibration process does not deal with the color conversion between nonlinear and linear characteristics as defined in sRGB color space. As a result, other colors excluding the colors having the maximum luminance are not properly calibrated so that the display device can not display these other colors to a high degree of accuracy. In addition, the conventional technology of calibrating the display device on production lines is detailed and complicated, and requires manpower for repeated measurement and adjustments. Therefore, it is impossible for the conventional technology to calibrate and adjust all the display devices on a production line individually; instead, the conventional technology measures and adjusts several samples on the production line, then utilizes parameters obtained from the samples to calibrate all the display devices. There will inevitably be fabrication deviations (e.g. parameter drift of the panel) between different display devices on the same production line. The conventional technology cannot provide the most proper parameters for each display device, and thereby fails to derive the best color calibration result.

As can be seen from the above-mentioned points, the conventional technology still has many shortcomings.

SUMMARY OF THE INVENTION

With this in mind, the present invention provides a color management circuit whose architecture is different from the conventional color management circuit. The color management circuit of the present invention individually processes all the color conversions defined in the color space so that each color defined in the color space can be faithfully represented by the display device. Hence, the distortion in the conventional technology due to the fact that the conventional technology only calibrates for colors having the maximum luminance can be improved.

Furthermore, via the color management circuit of the present invention, calibrating a single display device on a production line becomes simpler. Thus, the present invention also provides a color calibration method that can quickly calibrate the display devices on a production line. Since the time and cost of calibrating a single display device is significantly reduced, it is therefore possible to calibrate all display devices on a production line.

The present invention implements color management with a circuit. The circuit includes a first nonlinear conversion circuit, a color matrix conversion circuit and a second nonlinear conversion circuit. The first nonlinear conversion circuit performs a nonlinear conversion upon nonlinear color component values (e.g. RGB components) carried by an input signal in order to convert the nonlinear RGB component values into linear RGB component values. The second nonlinear conversion circuit is utilized for correcting the nonlinear response of the display device (e.g. the gamma characteristic with the gamma value of 2.2.). Subsequently, the second nonlinear conversion circuit can adjust the gamma characteristic of the display device as a linear characteristic, which assists in implementing the color conversion of the color space. With the help of the first and second nonlinear conversion circuit, nonlinear relationships in the displaying process can be completely eliminated. Accordingly, it is only necessary to utilize the color matrix conversion circuit for implementing the color conversion defined in color space (e.g. converting RGB component values into XYZ tri-stimulus values). Therefore, by properly configuring parameters of each sub-circuit in the color management circuit, colors defined in the target color space can be accurately represented by the display device.

According to one exemplary embodiment of the present invention, a color management circuit is provided. The color management circuit is disposed in a display device and a panel of the display device has a panel conversion characteristic. The color management circuit comprises a first nonlinear conversion circuit, a color matrix conversion circuit and a second nonlinear conversion circuit. The first nonlinear conversion circuit is utilized for performing a first nonlinear conversion upon a color data to generate a first conversion data. The color matrix conversion circuit is coupled to the first nonlinear conversion circuit and utilized for performing a linear matrix conversion upon the first conversion data to generate a matrix conversion data. The second nonlinear conversion circuit is coupled to the color matrix conversion circuit, and is utilized for performing a second nonlinear conversion upon the matrix conversion data to generate a second conversion data, wherein a combined conversion characteristic of a second nonlinear conversion characteristic of the second nonlinear conversion circuit with the panel conversion characteristic is substantially linear.

Furthermore, according to another exemplary embodiment of the present invention, a color management method applied to a display device is provided. The display device has a panel that is provided with a panel conversion characteristic. The color management method comprises: performing a first nonlinear conversion upon a color data to generate a first conversion data; performing a linear matrix conversion upon the first conversion data to generate a matrix conversion data; and performing a second nonlinear conversion upon the matrix conversion data to generate a second conversion data, wherein a combined conversion characteristic of a second nonlinear conversion characteristic of the second nonlinear conversion with the panel conversion characteristic is substantially linear.

These and other objectives of the present invention will no doubt become obvious to those of ordinary skill in the art after reading the following detailed description of the preferred embodiment that is illustrated in the various figures and drawings.

DETAILED DESCRIPTION

Hereinafter, sRGB color space will be given as an example for illustrative purposes. Accordingly, sRGB color space will also be referred to as a target color space with which a display device attempts to match. However, the selection of the target color space is not a limitation of the present invention. Those skilled in the art would be able to extend the color management method and circuit to apply to other color spaces after retaining the teaching of the present invention, which also falls within the scope of the present invention.

First of all, in the specification of sRGB color space, the relationship between RGB component values at the input end of a display device and CIE 1931 XYZ tri-stimulus values at the output of the display device (that is, where colors are shown) can be expressed as follows:

$$C_{linear} = \begin{cases} \dfrac{C_{srgb}}{12.92}, & C_{srgb} \le 0.04045 \\ \left(\dfrac{C_{srgb} + a}{1 + a}\right)^{24}, & C_{srgb} > 0.04045 \end{cases} \quad \text{Eq. (1)}$$

-continued $$\begin{bmatrix} X \\ Y \\ Z \end{bmatrix} = \begin{bmatrix} 0.4124 & 0.3576 & 0.1805 \\ 0.2126 & 0.7152 & 0.0722 \\ 0.0193 & 0.1192 & 0.9505 \end{bmatrix} \begin{bmatrix} R_{linear} \\ G_{linear} \\ B_{linear} \end{bmatrix}. \quad \text{Eq. (2)}$$

Wherein, in Eq. (1), $C_{srgb}$ and $C_{linear}$ respectively represent $R_{srgb}$, $G_{srgb}$ and $B_{srgb}$, and $R_{linear}$, $G_{linear}$, and $B_{linear}$. Eq. (1) represents the nonlinear conversion defined in sRGB color space, which converts nonlinear input color component values $C_{srgb}$ into linear color component values $C_{linear}$. Eq. (2) represents the color conversion defined in sRGB color space, which corresponds to a mapping from RGB color component values to XYZ tri-stimulus values. In order to accurately display the color gamut of a target color space, the color management circuit of the present invention takes the nonlinear response of the display device (i.e., gamma of 2.2) into account so that the combined displaying result of the display device and the color management circuit can be equal to all conversions (Eq. (1) and Eq. (2)) defined in the target color space.

Figure 1:
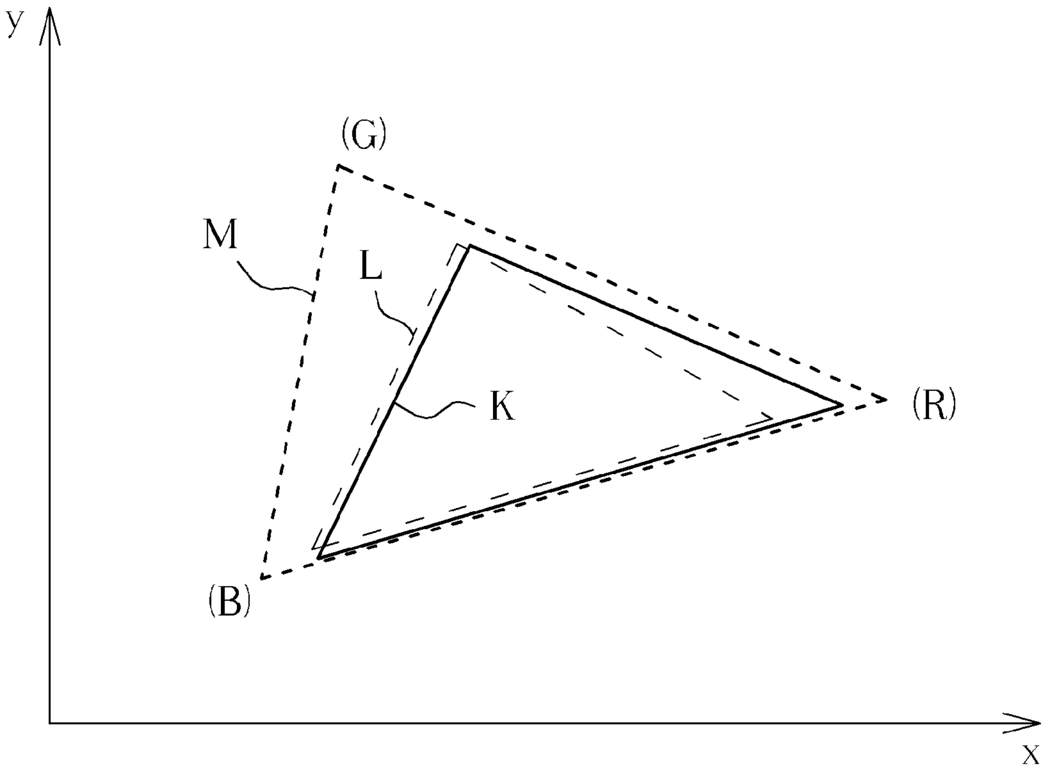
FIG. 1 PRIOR ART
FIG. 1 is a diagram showing relationships between the color gamut of sRGB color space and color gamuts of display devices.
Figure 2:
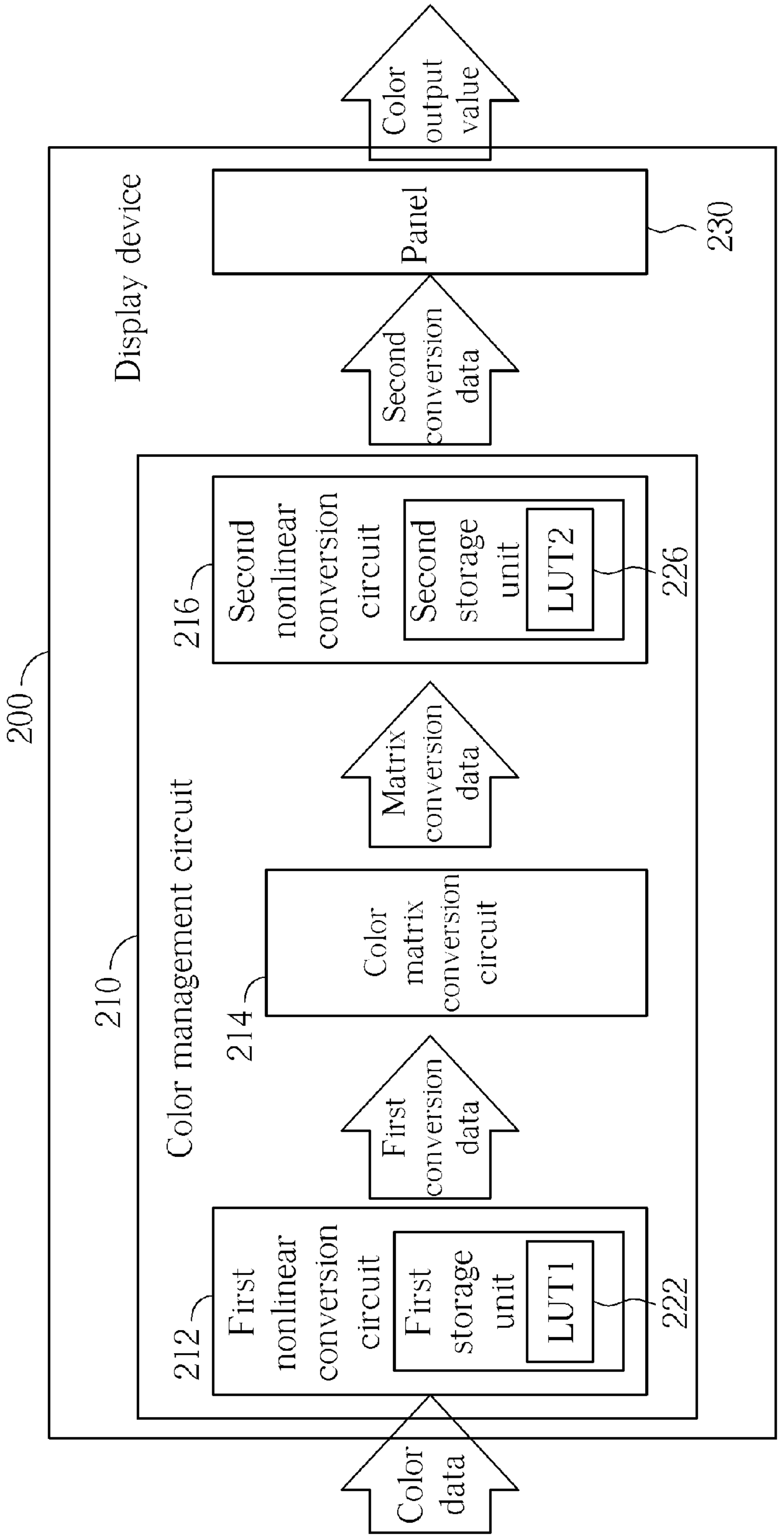
FIG. 2 is a block diagram of a color management circuit according to one exemplary embodiment of the present invention

Please refer to FIG. 2, which depicts a block diagram of a color management circuit according to one exemplary embodiment of the present invention. As shown in FIG. 2, a color management circuit 210 includes (but is not limited to): a first nonlinear conversion circuit 212, a color matrix conversion circuit 214 and a second nonlinear conversion circuit 216. The first nonlinear conversion circuit 212 is utilized for receiving a nonlinear color data (RGB component values) which is outputted from an external circuit (not shown). Since the color management circuit 210 is disposed in a display device 200, the external circuit could be a video adapter or any other device (e.g. a multimedia playback device) which can output video signals carrying the color data. The first nonlinear conversion circuit 212 performs a specific conversion X upon the nonlinear color data to generate a linear first conversion data according to the nonlinear conversion defined in sRGB color space. It should be noted that the specific conversion X will be changed depending on the target color spaces (e.g. Adobe RGB).

In this embodiment, the first nonlinear conversion circuit 212 includes a first storage unit 222 which stores a look-up table LUT1; wherein the first nonlinear conversion circuit 212 performs the specific conversion X to output the first conversion data according to the look-up table LUT1 and the color data. That is, the first nonlinear conversion 212 performs the nonlinear conversion defined in sRGB color space by referring to the look-up table. In addition to the look-up table, any other computing circuit which practically performs mathematical computation regarding the nonlinear conversion defined in sRGB color space also falls within the scope of the present invention. To reduce the storage space required by the look-up table LUT1, the manner of storing the look-up table LUT1 in the first storage unit 222 is particularly designed. In this embodiment, a part of the content of an original look-up table is properly discarded in order to generate a down-sized look-up table LUT1 to be stored in the first storage unit 222; that is, the look-up table LUT1 is generated by a lossy compression from an original look-up table. In fact, the original look-up table corresponds to the nonlinear conversion defined in sRGB color space. As readily appreciated by those skilled in the art, the function of this nonlinear conversion is approximately an exponential function. Therefore, larger output values increase significantly. Hence, the content of lower bits of a larger output value has a slight influence on the precision of the original look-up table. Based upon this phenomenon, the present invention stores the original look-up table by discarding the content of lower bits of the larger output value (e.g. at least one least significant bit (LSB)). Accordingly, when this compressed output value is read out, the discarded content will be replaced with 0.

For example, if the color data is represented by a predetermined number of bits (e.g. 12 bits), each output value of the original look-up table should be 12 bits long. As the content in lower bits of the larger output value does not notably affect the precision of the nonlinear conversion, it is feasible to discard the content in the least one or two bits of an output value that is longer than 10 bits. In other words, the data that is longer than 10 bits will be finally represented by 10 bits as a compressed output value and all the compressed output value will be referred to as the value of the compressed look-up table. The compressed look-up table is then stored in the first storage unit 222. In other words, those output values whose original number of bits is greater than 10 will be finally stored in the look-up table LUT1 with only 10 bits. When referring to the look-up table LUT1 to derive the output value, the discarded content of the compressed output value will be recovered with 0 no matter the original content. In this way, the de-compression for a compressed output value can be regarded as multiplying the compressed output value by 4. Please note that 10 bits is just an explanatory case, and not a limitation. In other words, during the process of generating an output value as the first conversion data according to the color data and the look-up table LUT1 stored in the first storage unit 222, if a value of the color data is smaller than a threshold (e.g. the maximum value 1111111111 that can be represented by 10 bits), the nonlinear conversion circuit directly outputs the corresponding output value in the look-up table LUT1; however, if a value of the color data is greater than the threshold, the corresponding output value in the look-up table LUT1 will be multiplied by a predetermined factor (i.e., 4) as the first conversion data. Since the number of bits of the output value directly outputted from the look-up table could be smaller than or identical to the original number of bits, the output value probably needs to be adjusted (or multiplied by a factor), depending on different conditions (e.g. whether the value of the color data is greater than the threshold), in order to generate the first conversion data correctly.

Then, the first conversion data will be inputted to the color matrix conversion circuit 214 to be processed by a linear specific conversion Y so that a matrix conversion data is generated, accordingly. The detailed description about the operation of the specific conversion Y will be explained in the following. In addition, the second nonlinear conversion circuit 216 performs a specific conversion Z upon the matrix conversion data to generate a second conversion data to a panel 230 of the display device 200. The second conversion data will be therefore shown on the panel 230.

Furthermore, via the specific conversion Z, a combined conversion characteristic of the second conversion characteristic of the second nonlinear conversion circuit 216 with the panel conversion characteristic of the panel 230 is substantially linear. In detail, the panel conversion characteristic of the panel 230 is a gamma characteristic with the gamma value of 2.2. In this way, utilizing the specific conversion Z, the combined conversion characteristic of the second conversion characteristic of the second nonlinear conversion circuit 216 with the panel conversion characteristic of the panel 230 can be regarded as a gamma characteristic with the gamma value of 1; that is, a linear gamma characteristic. In this embodiment, the second nonlinear conversion circuit 216 has a second storage unit 226 in which a look-up table LUT2 is stored within. The second nonlinear conversion circuit 216 performs specific conversion Z by referring to the look-up table LUT2 to generate the second conversion data. The conversion characteristic of the specific conversion Z depends on the panel conversion characteristic of the panel 230.

Thus, to carry out the color conversion defined in sRGB color space (i.e. equation (2)), a combined conversion characteristic of the color matrix conversion circuit 214, the second nonlinear conversion circuit 216 and the panel 230 has to be substantially identical to the color mapping matrix defined in the sRGB color space. However, if the target color space is Adobe RGB, the combined conversion characteristic of the color matrix conversion circuit 214, the second nonlinear conversion circuit 216 and the panel 230 has to be substantially identical to the color mapping matrix defined in the Adobe RGB color space. Furthermore, to make the combined conversion characteristic of the color matrix conversion circuit 214, the second nonlinear conversion circuit 216 and the panel 230 substantially identical to the color mapping matrix (i.e., the matrix in Eq. (2), hereinafter color mapping matrix TM) defined in the sRGB color space, a color calibration method is provided by the present invention. Firstly, the color calibration method of the present invention obtains an equivalent matrix PM corresponding to a linear combined conversion characteristic of the second nonlinear conversion circuit 216 with the panel 230. Then, a color conversion matrix YM corresponding to the specific conversion Y performed by the color conversion circuit 214 is obtained according to a relationship between the equivalent matrix PM and the color mapping matrix TM. Since the major objective is to make the combined conversion characteristic of panel 230 and different circuits have the relationship of [YM][PM]=[TM], the color conversion matrix YM can be derived by the equation of $[YM]=[TM][PM]^{-1}$. Moreover, if the equivalent matrix PM is utilized to compute with different color mapping matrices TMs defined in different target color spaces, different color conversion matrices YMs that are matched with different target color spaces can be derived. Accordingly, by utilizing these color conversion matrices YMs that are matched with different target color spaces to configure the color matrix conversion circuit 214, the display device can support different target color spaces. The way of deriving the equivalent matrix PM will be explained in the following.

Figure 3:
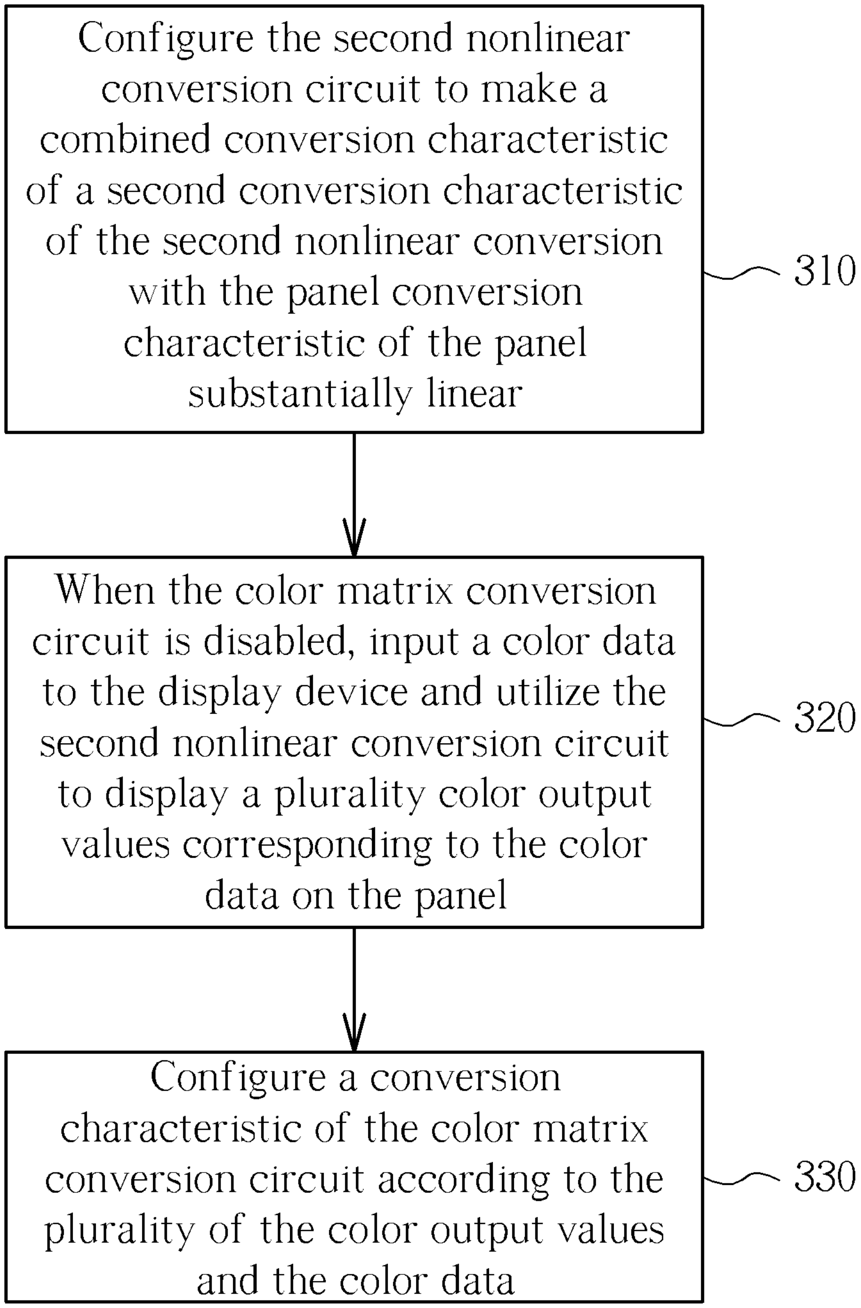
FIG. 3 is a flow chart of a color calibration method according to one exemplary embodiment of the present invention.

Please refer to FIG. 3, which depicts a flow chart of a calibration method according to one exemplary embodiment of the present invention. For configuring parameters in the color matrix conversion circuit 214 of the color management circuit 210 described above, the method of generating the equivalent matrix PM and the color conversion matrix YM is provided according to another embodiment of the present invention. Via the equivalent matrix PM, matrix elements of the color conversion matrix YM of the color matrix conversion circuit 214 can be obtained. The color calibration method of the present invention is applied to a display device having a panel. The panel has a panel conversion characteristic. In addition, the display device includes a color management circuit and the panel. The color management circuit includes (but is not limited to): a color matrix conversion circuit and a second nonlinear conversion circuit. The operation of the color calibration method can be briefly summarized as follows:

Step 310: Configure the second nonlinear conversion circuit to make a combined conversion characteristic of a second conversion characteristic of the second nonlinear conversion with the panel conversion characteristic of the panel substantially linear;

Step 320: When the color matrix conversion circuit is disabled, input a color data to the display device and utilize the second nonlinear conversion circuit to display a plurality color output values corresponding to the color data on the panel; and Step 330: Configure a conversion characteristic of the color matrix conversion circuit according to the plurality of the color output values and the color data.

To perform the color calibration method of the present invention, a nonlinear response of the panel for color component values (e.g. RGB values) in the color data has to be eliminated in advance. In this way, the color calibration method configures the second nonlinear conversion circuit to let a combined conversion characteristic of a second conversion characteristic of the second nonlinear conversion with the panel conversion be linear. Accordingly, the color calibration method further determines a mathematical function regarding the linear combined conversion characteristic of the panel with the second nonlinear conversion circuit. Thus in step 320, under the condition that the color matrix conversion circuit is inactivated, the color data is transmitted to the display device, and a plurality of color output values regarding the color data is displayed on the panel through the second nonlinear conversion circuit. By measuring these color output values, the mathematical function can be derived. More specifically, in one embodiment of the present invention, the color data may be generated by a signal generator to make the panel display color blocks corresponding to the color data. By utilizing a color analyzer, the luminance and the chromaticity regarding these color blocks can be measured so as to obtain the color output values.

In another embodiment of the present invention, however, it is also possible that the display device is controlled by an internal firmware of the display device to directly display these color blocks on the panel. In this case, the color analyzer measures the color output values. This modification also falls within the scope of the present invention. Furthermore, in this embodiment, the measured luminance and chromaticity of the color blocks are represented by XYZ tri-stimulus values in CIE 1931 color space. It should be noted that the color data in the foregoing operation is linear; however, the color data may be nonlinear in another embodiment of the color calibration method. If the color data is nonlinear, a first nonlinear conversion circuit included in the color management circuit is required to convert the nonlinear color data into a linear first conversion data. Thus, in step 320, under the condition that the color matrix conversion circuit is inactivated, the linear first conversion data is inputted into the display device and the panel displays a plurality of color output values regarding the linear first conversion data through the second nonlinear conversion circuit.

When these color output values are derived, the conversion characteristic of the color matrix conversion circuit can be further configured according to the color mapping matrix TM defined in a target color space that the display device attempts to match with and the relationship between these output values and the color data (or the linear first conversion data). Hence, in step 330, the conversion characteristic of the color matrix conversion circuit is configured based on the relationship between the color output values and the color data (or the linear first conversion data). More specifically, in the step of configuring the conversion characteristic of the color matrix conversion circuit according to the relationship between the color output values and the color data (or the linear first conversion data), a first specific conversion (corresponding to the equivalent matrix PM) is also determined according to the relationship between the color output values and the color data (or the linear first conversion data). In addition, a second specific conversion is determined to configure the conversion characteristic of the color matrix conversion circuit based on the predetermined color conversion (according to the color mapping matrix TM) defined in the target color space and the first specific conversion, wherein the second specific conversion corresponds to the aforementioned color conversion matrix YM. The color conversion matrix YM and the equivalent matrix PM can be generated by an external computer or an internal firmware of the display device.

Figure 4:
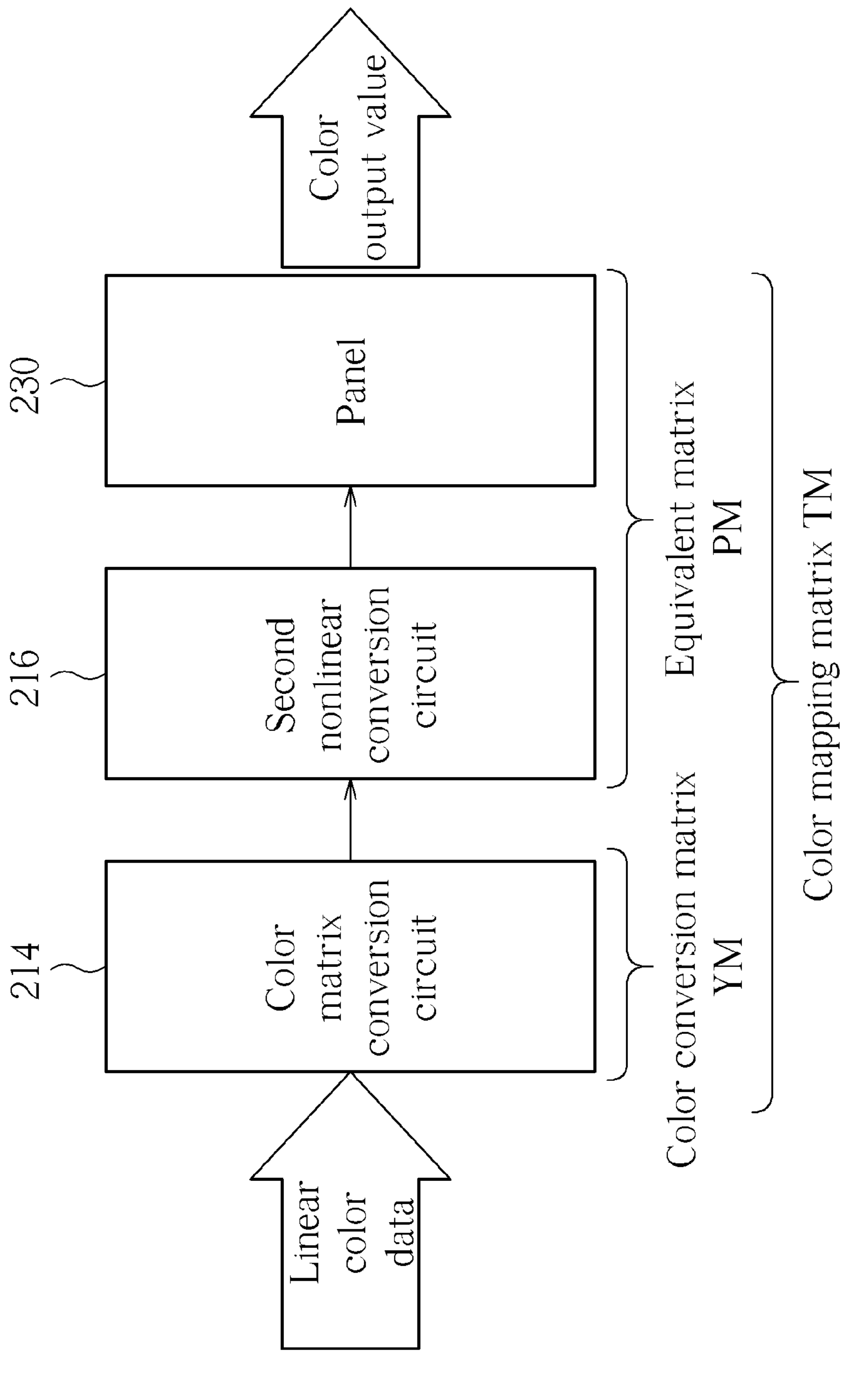
FIG. 4 is a diagram showing relationships between matrices and different circuits in the circuit management circuit as shown in FIG. 2.

In short, there is no limitation to how the device generates the equivalent matrix PM and the color conversion matrix YM; any hardware architecture that is capable of generating the equivalent matrix PM and the color conversion matrix YM can also be applied to the present invention. Furthermore, when the equivalent matrix PM is generated according to the color data and the color output values, different color conversion matrices YMs can be derived according to different color mapping matrices TMs corresponding to different target color spaces so that the calibrated display device can support different target color spaces. To clarify relationships between different matrices and circuits of the color management circuit as shown in FIG. 2, the relationships are depicted in FIG. 4. Since the relationships are expressly described above, a detailed description will not be repeated here for the sake of brevity.

Figure 5:
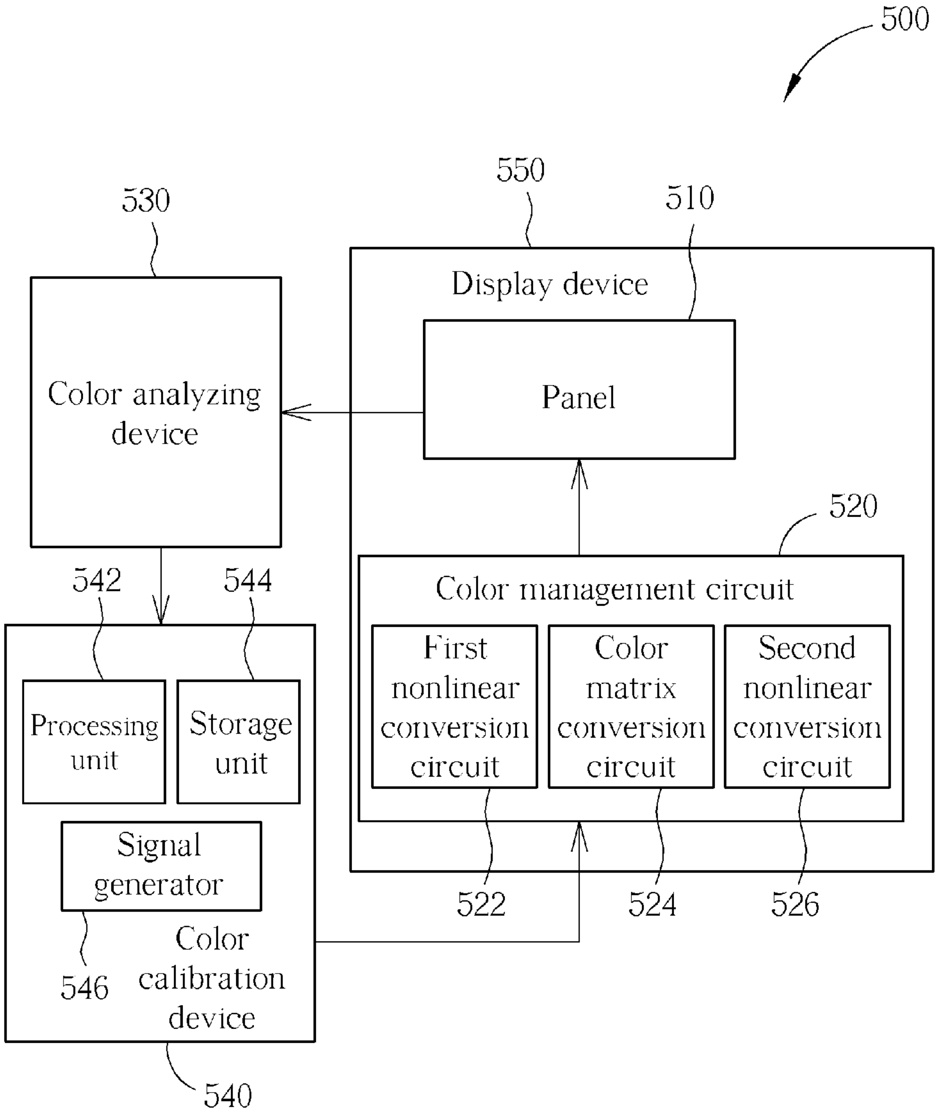
FIG. 5 is a block diagram of a color calibration system according to one exemplary embodiment of the present invention.

Based on the foregoing color management circuit and the foregoing color calibration method, a color calibration system according to another exemplary embodiment of the present invention is further provided. Please refer to FIG. 5, which depicts a block diagram of the color calibration system of the present invention. The color calibration system 500 includes (but is not limited to) a color analyzing device 530 and a color calibration device 540. The color calibration system is applied to a display device. The color analyzing device 530 is coupled to the color calibration device 540 and the display device 550. The display device 550 includes a panel 510 and a color management circuit 520, wherein the color management circuit 520 is coupled to the panel 510. In addition, the color management circuit 520 includes a first color nonlinear conversion circuit 522, a color matrix conversion circuit 524 and a second nonlinear conversion circuit. The color analyzing device is utilized for measuring color output values shown on the panel 510. In one embodiment, the color analyzing device 530 is a color analyzer, and measures the color output values, wherein the color output values are CIE 1931 XYZ tri-stimulus values.

The color calibration device 540 is coupled between the color analyzing device 530 and the color management circuit 520. The color management circuit 520 receives a nonlinear color data. In this embodiment, according to the aforementioned color calibration method the second nonlinear conversion circuit 526 is configured to make a combined conversion characteristic of the conversion characteristic of the second nonlinear conversion circuit 526 with the panel conversion characteristic of the panel 510 be linear. Accordingly, under the condition that the color matrix conversion circuit 524 is inactivated, a linear first conversion data is inputted to the second nonlinear conversion circuit 526, wherein the linear first conversion data is obtained by the process of the first nonlinear conversion circuit 522 performing a first nonlinear conversion upon the nonlinear color data (e.g. RGB color data). Moreover, the second nonlinear conversion circuit 526 enables the panel 510 to display colors corresponding to the color data according to the linear conversion. Thus, the color analyzing device 530 measures colors shown on the panel 510 to obtain the color output values, and outputs the color output values to the color calibration device 540 to further configure the conversion characteristic of the color matrix conversion circuit 524.

In one embodiment, the color calibration device 540 includes a processing unit 542, a storage unit 544 and a signal generator 546, wherein the signal generator 546 is utilized for generating signals carrying the color data to the display device 550, wherein the display device 550 then accordingly shows corresponding color blocks. The storage unit 544 stores a plurality of color mapping matrices TMs corresponding to different target color spaces, and also stores the color output values. Furthermore, the processing unit 542 firstly generates an equivalent matrix PM according to the linear first conversion data and the color output values, and utilizes the equivalent matrix PM and the color mapping matrix TM to configure the color conversion matrix YM of the color matrix conversion circuit 524. With the several different color mapping matrices TMs of different target color spaces, the display device 550 will support all color gamuts of these target color space after calibration. In another embodiment, the processing unit 542 and the storage unit 544 could be disposed in the display device 550. The color calibration device 540 stores the color output values in the storage unit 544 of the display device 550, and the storage unit 544 also stores a plurality of color mapping matrices TMs corresponding to a plurality of different target color spaces. Thus, a user can select the color space that he/she wants the display device 550 to operate in through an on-screen display (OSD). Then, the processing unit 542 determines the corresponding color mapping matrix TM from the storage unit 544, and generates the equivalent matrix PM, thereby obtaining the color conversion matrix YM to configure the color matrix conversion circuit 522. Thus, the color management mechanism of the present invention lets the user switch the display device to match with two or more color spaces.

Based on the aforementioned color management circuit, a color management method according to one exemplary embodiment of the present invention is provided, which is applied in a display device. The display device has a panel that is provided with a panel conversion characteristic. The color management method includes: performing a first nonlinear conversion upon a color data to generate a first conversion data; performing a linear matrix conversion upon the first conversion data to generate a matrix conversion data; and performing a second nonlinear conversion upon the matrix conversion data to generate a second conversion data; wherein a combined conversion characteristic of a second nonlinear conversion characteristic of the second nonlinear conversion with the panel conversion characteristic is substantially linear. Since the operation of each step has been explained in the description regarding the color management circuit, it is omitted here for the sake of brevity.

In conclusion, due to the bottleneck in fabrication of conventional display devices, it is impossible to fabricate a display device which can be fully matched with a certain color space. In view of this, the color management circuit and the color calibration method and related system of the present invention can particularly improve the deviation between the color gamut of a certain color space and a wider color gamut of a wider-color-gamut display device by accurate calibration.

Those skilled in the art will readily observe that numerous modifications and alterations of the device and method may be made while retaining the teachings of the invention.

What is claimed is:

1. A color management circuit, disposed in a display device, a panel of the display device having a panel conversion characteristic, the color management circuit comprising:

a first nonlinear conversion circuit, for performing a first nonlinear conversion upon a color data to generate a first conversion data;

a color matrix conversion circuit, coupled to the first nonlinear conversion circuit, for performing a linear matrix conversion upon the first conversion data to generate a matrix conversion data; and a second nonlinear conversion circuit, coupled to the color matrix conversion circuit, for performing a second nonlinear conversion upon the matrix conversion data to generate a second conversion data;

wherein a combined conversion characteristic of the second nonlinear conversion characteristic of the second nonlinear conversion circuit with the panel conversion characteristic is substantially linear.

2. The color management circuit of claim 1, wherein the color data is a nonlinear color data and the nonlinear color data is converted into a linear first conversion data by the first nonlinear conversion.

3. The color management circuit of claim 1, wherein the first nonlinear conversion circuit is implemented with a look-up table.

4. The color management circuit of claim 3, wherein the color data is represented by a predetermined number of bits and the look-up table is referred to for the color data according to a number of bits that is smaller than the predetermined number of bits.

5. The color management circuit of claim 4, wherein the predetermined number of bits of the color data is 12 and the look-up table is referred to according to 10 bits out of 12 bits of the color data.

6. The color management circuit of claim 4, wherein when a value of the color data is smaller than a threshold value, the first nonlinear conversion circuit directly outputs a value obtained by referring to the look-up table as the first conversion data; and when a value of the color data is larger than the threshold value, the first nonlinear conversion circuit adjusts a value obtained by referring to the look-up table with a predetermined factor as the first conversion data.

7. The color management circuit of claim 1, wherein a matrix element of the color matrix conversion circuit is determined by the panel conversion characteristic.

8. The color management circuit of claim 1, wherein the second nonlinear conversion circuit is implemented with a look-up table.

9. The color management circuit of claim 1, wherein the panel conversion characteristic is a gamma characteristic.

10. The color management circuit of claim 1, wherein the color data is red (R), green (G) and blue (B) color data.

11. A color management method, applied to a display device, a panel of the display device having a panel conversion characteristic, the color management method comprising:

performing a first nonlinear conversion upon a color data to generate a first conversion data;

performing a linear matrix conversion upon the first conversion data to generate a matrix conversion data; and performing a second nonlinear conversion upon the matrix conversion data to generate a second conversion data;

wherein a combined conversion characteristic of the second nonlinear conversion characteristic of the second nonlinear conversion with the panel conversion characteristic is substantially linear.

12. The color management method of claim 11, wherein the color data is a nonlinear color data and the nonlinear color data is converted into a linear first conversion data by the first nonlinear conversion.

13. The color management method of claim 11, wherein the step of the first nonlinear conversion is implemented with a look-up table.

14. The color management method of claim 13, wherein the color data is represented by a predetermined number of bits and the look-up table is referred to for the color data according to a number of bits that is smaller than the predetermined number of bits.

15. The color management method of claim 14, wherein the predetermined number of bits of the color data is 12 and the look-up table is referred to according to 10 bits out of 12 bits of the color data.

16. The color management method of claim 14, wherein when a value of the color data is smaller than a threshold value, a value obtained by referring to the look-up table is directly outputted as the first conversion data; and when a value of the color data is larger than the threshold value, a value obtained by referring to the look-up table is adjusted with a predetermined factor as the first conversion data.

17. The color management method of claim 11, wherein a matrix element of the color matrix conversion circuit is determined by the panel conversion characteristic.

18. The color management method of claim 14, wherein the step of the second nonlinear conversion is implemented with a look-up table.

19. The color management method of claim 11, wherein the panel conversion characteristic is a gamma characteristic.

20. The color management method of claim 11, wherein the color data is red (R), green (G) and blue (B) color data.

* * * * *